No. 862,505. PATENTED AUG. 6, 1907.
W. R. PERRIN.
RETAINING RACK FOR MEAT HOOKS.
APPLICATION FILED FEB. 4, 1907.

2 SHEETS—SHEET 1.

Witnesses,
Inventor,
William R. Perrin
By Offield Towle & Linthicum
Att'ys.

No. 862,505.
PATENTED AUG. 6, 1907.
W. R. PERRIN.
RETAINING RACK FOR MEAT HOOKS.
APPLICATION FILED FEB. 4, 1907.
2 SHEETS—SHEET 2.
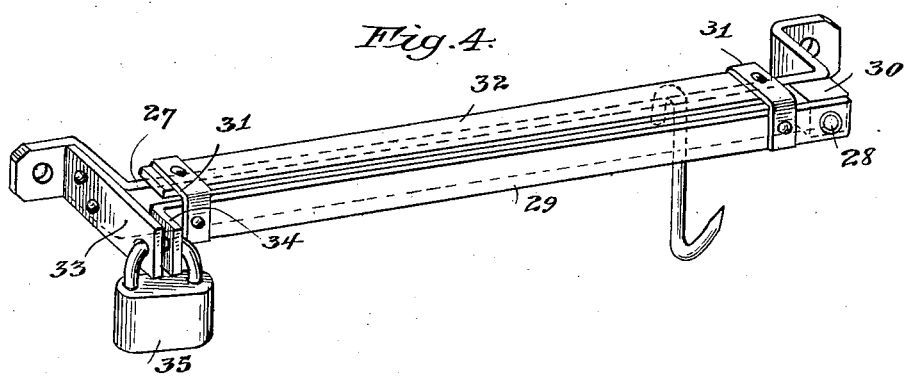
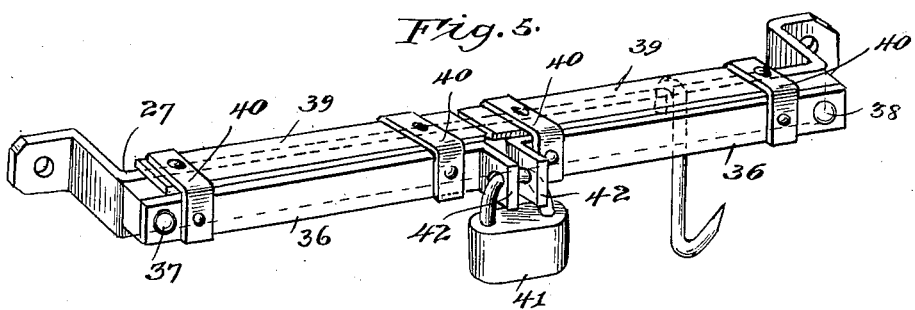
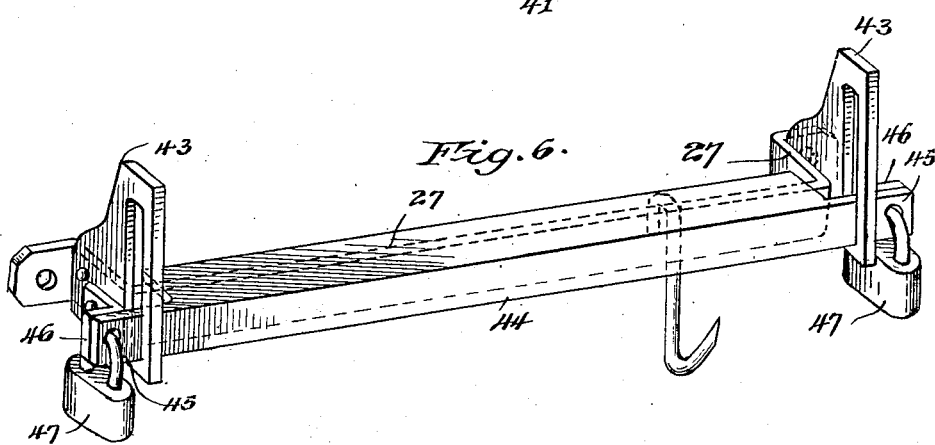

UNITED STATES PATENT OFFICE.

WILLIAM REDFIELD PERRIN, OF CHICAGO, ILLINOIS.

RETAINING-RACK FOR MEAT-HOOKS.

No. 862,505.     Specification of Letters Patent.     Patented Aug. 6, 1907.

Application filed February 4, 1907. Serial No. 355,721.

*To all whom it may concern:*

Be it known that I, WILLIAM REDFIELD PERRIN, a citizen of the United States, residing at Chicago, in the county of Cook and State of Illinois, have invented certain new and useful Improvements in Retaining-Racks for Meat-Hooks, of which the following is a specification.

It is customary while unloading a refrigerator car for transporting meat, such as beef, mutton and pork, to throw the meat hooks which have sustained the bodies or sides during transportation, into a corner or end of the car. Experience has proven that before the car has completed its return trip a considerable portion of these hooks have been stolen, lost or swept out of the car, either purposely or carelessly. This loss of hooks in a year is an item of considerable unnecessary expense, and consequently I have devised a rack adapted to receive these hooks during non-use, the rack having locking means to prevent their withdrawal or removal. The preferred embodiment of my invention includes a hook-supporting bar fastened in any suitable manner to a convenient part of the car, such as across the inside of the end wall, and sufficiently high so as not to interfere with any class of lading, a pivoted locking bar or bars adapted to lie adjacent to the hooks in one position to prevent their removal from their support, and a lock or the like to maintain the locking bar or bars in hook-retaining position.

Figure 1:
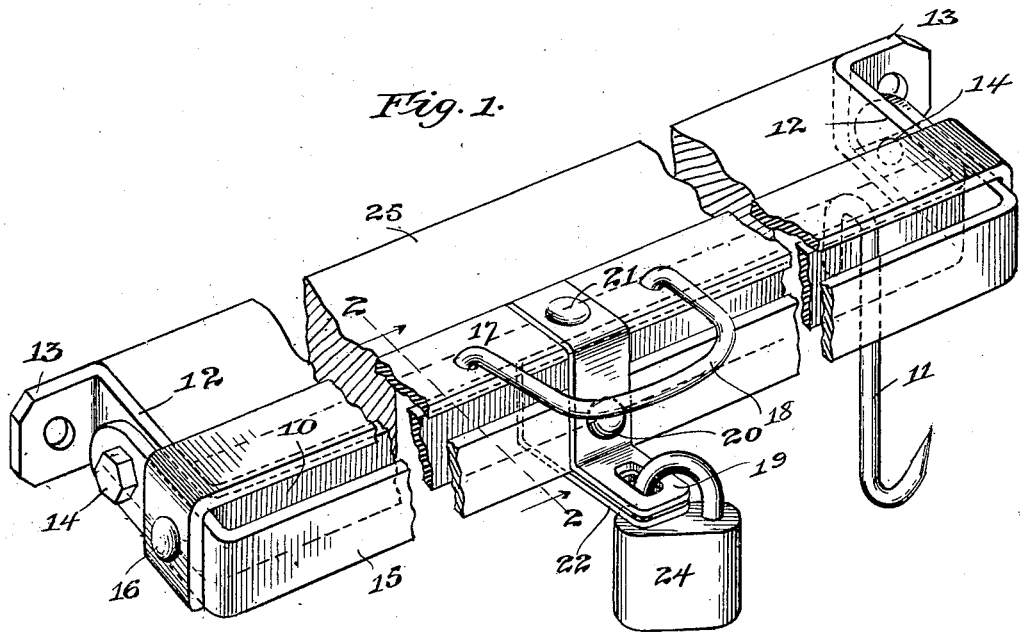
Figure 2:
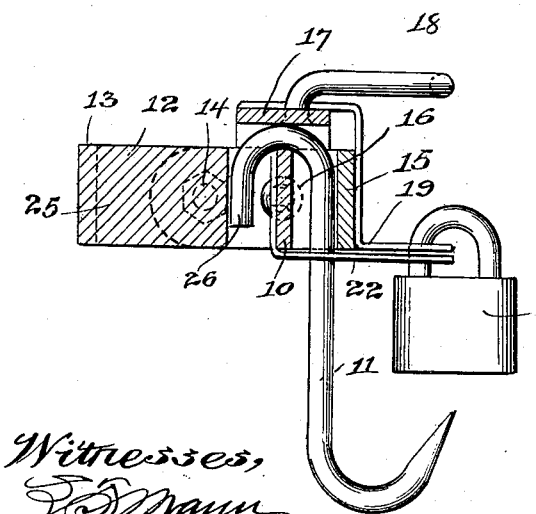
Figure 3:
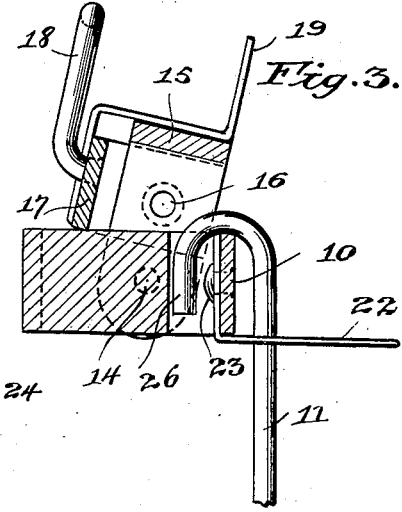

Referring to the accompanying drawings forming a part of this specification,—Figure 1 is a fragmentary perspective view of my improved device; Fig. 2 is a cross section on line 2—2 of Fig. 1, showing a hook locked in position; Fig. 3 is a view similar to that of Fig. 2, with the locking bars raised, whereby the hook may be removed; and Figs. 4, 5 and 6 are perspective views of modified forms of hook racks.

My preferred meat-hook support and retainer includes a sustaining bar 10, the top edge of which the hooks 11 are adapted to engage, the members 11 being hook-shaped at each end, the lower sharp end to penetrate the supported carcass, and the upper end to hook over the bar 10 or other support; depending upon whether the hook is in use or not. The bar 10 has lateral offset legs 12 to space the same from the wall to which it is attached by means of apertured end ears 13. The length of supporting bar 10 may be anything desirable, and if necessary the bar may extend across the full width of the car-body end-wall, intermediate braces being provided if necessary. Pivoted or hinged to legs 12 at 14 is a U-shaped bar or rod 15 adapted when in hook-locking position to lie in front of the shanks of hooks 11, as shown in Fig. 2. Riveted to the legs of bar 15 at the point 16 is a similar U-shaped bar 17 in hook-retaining position, overlying the tops of the hooks above the upper edge of supporting bar 10, the pair of bars 15 and 17 forming a pivoted hook-locking member of angle shape in cross section. Top bar 17 is equipped with an operating handle 18 fastened thereto in any suitable manner, and affording means for raising and lowering the complete pivoted or hinged hook-locking member. Members 15 and 17 are also equipped with an apertured forwardly-extended ear or hasp 19 riveted at 20 and 21 to the exterior faces of bars 15 and 17. Ear 19 is adapted to register with a similar ear or lug 22 fastened at 23 to hook-supporting bar 10. When the ears are brought together, as shown in Figs. 1 and 2, with the locking member in position to prevent withdrawal of the hooks, they may be fastened together with a padlock 24 or similar appliance, whereby only persons with keys are enabled to remove the meat hooks. As is illustrated, a wooden or other block 25 may be positioned behind the inner ends of the hooks to aid in preventing their removal.

When the meat is being taken from the car, or afterwards, the hooks of all sizes are hung on bar 10, as shown, the locking member 15—17 being raised at the time, as illustrated in Fig. 3. After all of the hooks have been mounted or hung up, as stated, the locking member or frame is swung down, turning on its pivots or hinges, whereby bar 17 is positioned over the hooks to prevent their being lifted, while bar 15 is brought in front of the shanks of the hooks to prevent their withdrawal by turning their lower ends rearwardly, thereby allowing their upper ends to pass out between the top edge of bar 10 and the under or bottom face of locking bar 17. If the supporting member 10 is made of sufficient depth to prevent this swinging of the bottom ends of the hooks backwardly, then the front bar 15 may be dispensed with. The attaching of padlock 24 to ear 19 and 22 securely locks the hooks in place and effectively eliminates all danger of their being lost or stolen. Removal of the padlock and lifting of the locking frame renders the hooks accessible for use, as will be readily understood.

When block 25 is employed, it, together with the bars 10 and 15, act to prevent the lower ends of the hooks being pushed back and the top ends being swung forwardly, whereby extrication of the top back prong 26 of the hook normally between parts 10 and 25 from between bars 10 and 17, and the shank from between bars 10 and 15, is effectively blocked.

My improved device is made of such size as to accommodate the largest hooks employed in the meat transportation industry, and its parts are so proportioned that it will also prevent the disengagement therefrom of all ordinary hooks smaller than the largest. One advantage of my improved retaining rack is the fact that all of the hooks are in plain view, so that the absence of any appreciable number would be at once apparent.

The modification shown in Fig. 4 has a hook supporting bar 27 like the bar 10 to one end of which at 28 is pivoted or hinged a bar 29 adapted to lie in front of the hooks, a spacer or filler block 30 being interposed between the bars. Fastened to bar 29 by right angle brackets 31 is a top bar 32 adapted when in lowered position to overlie and rest upon the tops of the hooks. At the end of bar 27 remote from the pivot or hinge bolts or rivet 28 is riveted an apertured forwardly-projecting metal strip 33 and the adjacent end of bar 29 is bent outwardly at 34 and apertured in alinement with the hole in port 33 whereby the shackle for a padlock 35 may lock the members 33 and 34 together and irremovably hold the hooks on the supporting bar.

In Fig. 5 a structure is shown similar to that illustrated in Fig. 4 but in this form of my device instead of using a single bar 29 I use two such members 36 hinged to opposite ends of the hook-supporting bar at the points 37 and 38. Each strip 36 has a bar 39 fastened thereto by brackets 40 as in the previous instance. A padlock 41 is adapted to lock together the out-turned proximate ends 42 of bars 36 by having its loop or shackle pass through holes therein. This locking together of the bars prevents their being swung upwardly and prevents the removal of the hooks except by a person having a key of the lock.

In the form of device illustrated in Fig. 6 a bar 27 is employed and to its ends are riveted upstanding slotted brackets or plates 43. For a locking member I use an ordinary angle bar 44 and cut away the horizontal flange at each end to provide the oppositely-extended end ears 45 adapted to pass through and slide in the vertical slots of plates 43. These ears have holes outside of the slots as do also the small angles 46 fastened against the outer faces of plates 43. By using a padlock 47 at each end of the device bar 44 may be locked down in hook retaining position. By unlocking and removing the padlocks angle bar 44 whose flanges lie in front of and over the hooks may be raised allowing the hooks to be removed as is obvious.

Obviously the details of structure of the device shown and described can be varied widely and still fall within the purview of my invention.

I claim:

1. In a device of the character described, the combination of a supporting bar upon which hooks are adapted to hang, a movable locking bar extended lengthwise said supporting bar and adapted to prevent removal of a plurality of the hooks from said supporting bar when in one position and to permit their removal when in another position, and means to fasten said locking bar in hook-retaining position, substantially as described.

2. In a device of the character described, the combination of a supporting bar upon which hooks are adapted to hang, a locking bar, separate from the hooks, movable toward and from the top of said supporting bar, and adapted to prevent removal of a plurality of the hooks from said supporting bar when in one position and to permit their removal when in another position, and means to fasten said locking bar in hook-retaining position, substantially as described.

3. In a device of the character described, the combination of a supporting bar upon which are hooks adapted to hang, a movable locking member adapted to prevent removal of the hooks from said supporting bar when in one position and permit their removal when in another position, said member having a part adapted to overlie the tops of the hooks and a part to lie in front of their shanks when said member is in hook-retaining position, and means to lock said locking member in hook-retaining position, substantially as described.

4. In a device of the character described, the combination of a supporting bar upon which hooks are adapted to hang, a pivoted locking member adapted to prevent removal of the hooks from said supporting bar when in one position and permit their removal when in another position, said member comprising two bars at right angles to one another, one of said bars overlying the tops of said hooks and the other being disposed in front of their shanks when said member is in hook-retaining position, and means to lock said locking member in hook-retaining position, substantially as described.

5. In a device of the character described, the combination of a supporting bar upon which hooks are adapted to hang, a locking member hinged to said supporting bar and adapted to prevent removal of the hooks from said supporting bar when in one position and permit their removal when in another position, said member comprising two bars at right angles to one another, one of said bars overlying the tops of said hooks and the other being disposed in front of their shanks when said locking member is in hook-retaining position, an operating handle secured to said locking member, an apertured ear attached to said locking member, an apertured ear fastened to said supporting member, and a padlock adapted to pass through the apertures of said ears and lock said locking member in hook-retaining position, substantially as described.

WILLIAM REDFIELD PERRIN.

Witnesses:
E. M. BARBIAN,
L. I. TEMPLETON.